Figure 1:
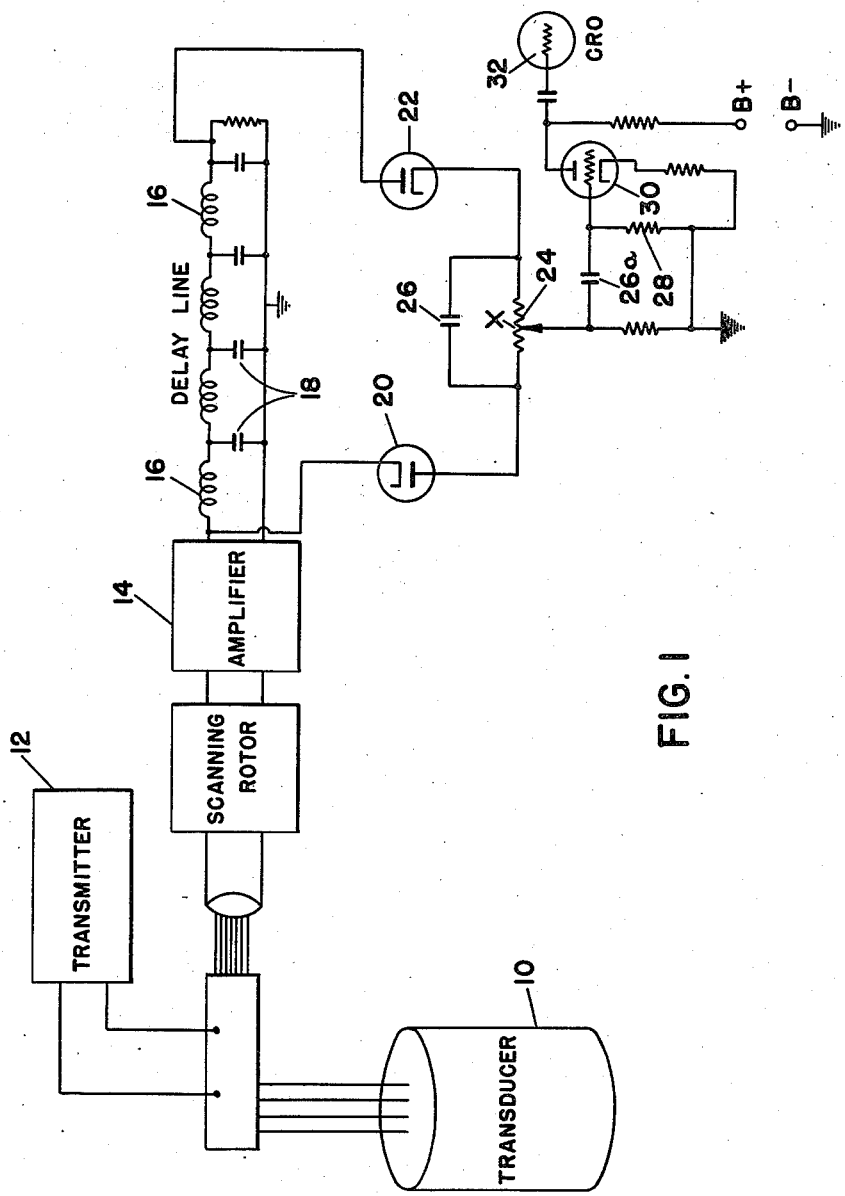

June 14, 1955

S. R. RICH 2,710,950

DELAYED LOBE COMPARISON

Filed Sept. 19, 1945

2 Sheets-Sheet 1

Inventor
STANLEY R. RICH

By Ralph L. Chappell
Attorney

June 14, 1955 S. R. RICH 2,710,950
DELAYED LOBE COMPARISON

Filed Sept. 19, 1945 2 Sheets-Sheet 2

INVENTOR
STANLEY R. RICH
BY
ATTORNEY

United States Patent Office 2,710,950
Patented June 14, 1955

2,710,950

DELAYED LOBE COMPARISON

Stanley R. Rich, Cambridge, Mass., assignor to the United States of America as represented by the Secretary of the Navy Application September 19, 1945, Serial No. 617,368

4 Claims. (Cl. 340—6)

This invention relates to scanning echo ranging systems and is particularly directed to the receiver portion of such a system.

The invention is hereinafter described with particular reference to underwater sound echo ranging systems, but is equally applicable to systems using other types of wave energy.

Scanning systems as they have been developed up to the present time include the transmission of an omnidirectional pulse of compressional wave energy and the reception of echoes of the pulse by means of a transducer having directional characteristics. The directivity of the transducer can be induced by mechanical construction, in which case the unit is rotated, or electrically by beam forming lines associated with a scanning rotor. Two major types of electrical beam or pattern formation have been used, one of which employs a capacity commutator the stator of which is segmented to provide a segment corresponding to each element of a multielement transducer, while the rator is composed of an effectively less numerous group of segments facing the stator and associated with a lag line in such a manner that signals received in all of the active rotor elements are caused to add to produce a single signal which is subsequently amplified and presented to the operator. The second major type of scanning system replaces the capacity commutator with an electronic commutator in which the scanning is accomplished by progressive activation of constantly connected receiving circuits associated with each transducer element in a manner to produce a rotating beam pattern.

In both the capacity and electronic rotation types of scanning systems one of the most troublesome problems has been to provide means to so sharpen the presentation of an amplified signal as to reduce the bearing error which may follow as a result of an indefinitely defined signal on the CRO or cathode ray oscilloscope, which may conveniently be employed for detection and location of a target of the search. The systems at present in use rely for the most part on brightening the CRO beam only as a function of signal amplitude and only minor attempts have been made to utilize lobe comparison techniques to increase the definition on the screen by increasing the sharpness of the signal applied to the brightening grid of the CRO.

It has previously been proposed to establish, in a scanning transducer output system, a plurality of concomitant lobes spaced apart in their rotation and comparing the signal intensities simultaneously existing in the lobes. When the signal intensities from a given source are equal in the two lobes the brightening signal derived therefrom is at a maximum. The brightening signal is, also, of shorter duration than is the case with the "straight amplitude brightening" so that the presentation is sharper and the target better defined. In a capacity rotation system this is done by using two or more lag lines in the rotor, and in the electronic rotation system by providing a rotor for each of the "lobes" to be rotated.

The primary object of the present invention is to provide a simple and efficient means to operate a scanning echo ranging system in such a manner that the signal presentation is a comparison of the intensity of two or more spaced-in-time signals.

Another object of the invention is to provide means to brighten a cathode ray tube of a scanning echo ranging system in accordance with the derivative with respect to time of the difference in intensity between an instantaneously existing signal and a signal which has been delayed, the delay period being adjusted to equal the time taken for a rotating lobe of sensitivity to traverse completely from one transducer element to the next adjacent element.

Figure 3:
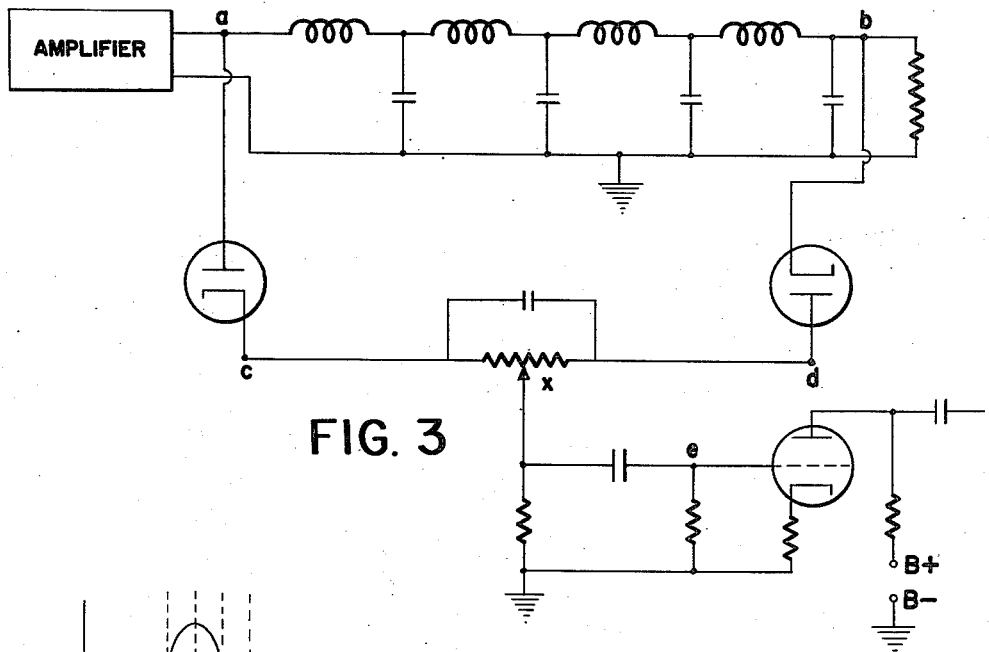
Figure 2:
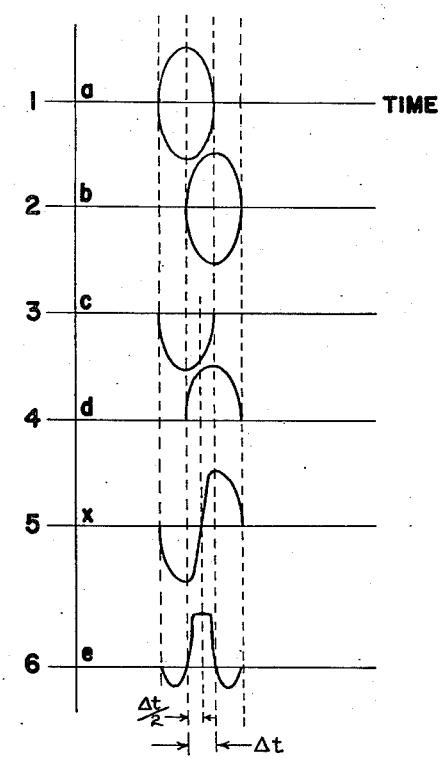

Other objects and advantages of the invention will become apparent as the description proceeds, reference being had to the accompanying drawings in which Fig. 1 is a schematic diagram which shows the essential elements of a scanning system embodying the present invention, Fig. 2 is a series of voltage/time curves at several points in the system, and Fig. 3 indicates the location of these points in the system.

Referring to the schematic, there is shown diagrammatically an echo ranging system including a transducer 10 which is preferably of the multielement type in which similar magnetostriction or crystal elements are disposed in an outwardly facing array covering all, or a selected part of the underwater horizon. For example, the transducer may consist of 36 similar elements each of which covers substantially 10° of a cylindrical face.

A transmitter 12 is provided which periodically furnishes a pulse of energy to the transducer through send-receive transfer devices which are unimportant here and hence not shown. At each pulse of energy from the transmitter a sound pulse is emitted into the medium and after striking a reflecting object, a portion of the transmitted sound energy is returned to the transducer. The returning sound mechanically excites the transducer elements and produces electrical impulses therein.

Each transducer element is connected, for reception, to a corresponding element of a scanning rotor as disclosed in the copending application of Oscar Hugo Schuck et al., Serial Number 549,460, now Patent No. 2,697,822, and my copending application, Serial No. 563,042, now Patent No. 2,703,396. The function of the scanning rotor is to produce a rotating beam of sensitivity which is passed around the transducer at a selected frequency, for example, 30 times per second. This is accomplished, in the case of the 36 element capacity commutator by interconnection of a limited number of rotor plates by means of a beam forming line which, of course, effectively rotates the pattern or beam as the rotor is turned.

The received signal from the transducer is thus commutated and subsequently passed to a conventional single channel amplifier 14. If desired, the signal frequency can be changed at this stage for the convenience of the remainder of the system, for example the signal frequency may here be made audible, or it may be raised or lowered from the frequency of transmission.

The output of amplifier 14 is passed down a delay line composed of series inductances 16 and shunt capacitances 18. The components of the line are chosen to provide at the amplifier output frequency a delay time equal to the length of time taken for a given point on the beam of sensitivity to pass through an arc equal to the angle subtended by a single transducer element.

A rectifier 20 is connected to the beginning of the delay line, and a second rectifier 22 is connected to a point at the end of the line. The two rectifier outputs are made of opposite polarity and are placed electrically in series through a resistor 24 with which is associated a filter condenser 26 to filter out signal frequency components.

The demodulated signal from rectifier 20 is thus subtracted from the demodulated signal from rectifier 22 so that at a point X there is available at all times the instantaneous difference in the amplitude of the signal envelopes at the beginning and end of the delay line.

The voltage at point X is then differentiated with respect to time in the circuit containing capacitor 26a and resistor 28 and amplified in any suitable amplifier 30 and put out in the proper phase to produce a strong brightening signal to be impressed on a brightening grid 32 of a CRO tube.

It will be apparent that the brightening signal will be a maximum when the rate of change with respect to time of the difference voltage at point X is greatest. This rate of change will be greatest when the original signal is large and when the two "lobes" created by the delay line bracket the target so that the signal intensity in each lobe and hence in each rectifier is the same.

The operation of the system can best be followed by reference to Fig. 2. Curve 1 represents a typical echo pulse applied to the delay line at point $a$ by the amplifier. The envelope represents substantially the shape of the rotated transducer pattern. The frequency of the signal shown is that of the output of the amplifier. Curve 2 represents the same pulse as it is seen at point $b$ of the delay line at a time $\Delta t$ later which is the delay time of the line. As previously stated this time is related to the rotation or scanning frequency and is equal to $$\frac{1}{nf_r}$$

where $n$ is 360° divided by the angle subtended by one element and $f_r$ is the frequency of rotation. Curve 3 is the envelope of the pulse developed by the rectifier 20 connected to point $a$. Curve 4 is the envelope of the pulse developed by the rectifier 22 connected to point $b$ and delayed in time with respect to curve 3 an amount $\Delta t$ as defined above. By the process of connecting the rectifier elements of rectifier 20 opposite to those of rectifier 22, all signals at point $c$ are negative with respect to ground and all signals at point $d$ are positive with respect to ground. At point X, then, there appears at all times the difference between the amplitudes of the envelopes of curves 1 and 2. Curve 5 is the difference between curves 3 and 4 as seen at point X. During the time $\Delta t$ at the beginning of the curves shown, only rectifier 20 produces an envelope output because none of the signal has yet reached point $b$. The curve 5 increases negatively during this interval. As signal reaches point $b$, the difference between $c$ and $d$ becomes smaller, reaching zero when the signal envelope amplitude at $c$ and $d$ are equal. At this time, the peak of the original pulse lies midway between points $a$ and $b$ on the delay line. This is represented by the intervals $\Delta t/2$ shown on curves 3, 4 and 5. After the peak of the pulse passes on toward $b$ the voltage at $d$ is greater than at $c$ so that a point X, signal rises an equal and opposite amount and then falls off to zero as the pulse is absorbed at the end of the line. Curve 6 shows the derivative with respect to time of curve 5. A negative voltage is produced for negative slopes of curve 5 and a positive voltage produced for positive slopes. Curve 6 consists, then, of a small negative portion due to the first negative slope of curve 5, followed by a large positive portion due to the main, or positive slope of curve 5, followed by another small negative portion. The positive pulse of curve 6 is used to brighten the CRO grid (through amplifier 30). This new positive brightening pulse is narrower in width than the original pulse and occurs at a time which accurately marks the instant when the echo pulse maximum lies in the delay line equally distant from points $a$ and $b$.

Rectifiers 20 and 22 can be inserted ahead of the delay line, so that only the envelope goes down the line. Prior rectification, effected in this manner permits the use of a smaller number of delay line components since the frequency is reduced and the line can, therefore, be shorter for a given time delay.

What I claim is:

1. In an echo locating system of the character described, directional signal scanning means including a segmented transducer and a scanning rotor of fixed rate for operatively connecting the transducer segments in successive timed energizing order to said system, an amplifier in the system connected for amplifying successively the signals from said segments, means rectifying signals of a first polarity from said amplifier, a delay network connected to the amplifier and adjusted to delay each signal by a predetermined fractional part of the interval of connection of each said segment to the ampliifier, means rectifying signals of polarity opposite said first polarity connected to said delay network, and circuit means responsive to the rate of change of the difference between said rectified signals for energizing a system output circuit.

2. In a submarine sonic location indicator system, reflected signal receiving means including a plurality of directional receiver units distributed over a listening arc, means energizing said units selectively in rotational succession, signal amplifying means energized by the instantly selected one of said units, rectifying means transmitting amplified signals of a first polarity, a delay line connected and adjusted to delay the passage of amplified signals by a time equal to a predetermined fraction of the time for scanning a transducer segment in reception, rectifying means connected to provide from said delay line a signal of polarity opposite said first polarity, and circuit means responsive to the rate of change of the difference between the respective amplitudes of said rectified signals for energizing the indicator of said system, whereby the indicator is energized for a limited fraction of the receiving time.

3. In a device for enhancing the sharpness of an echo indication of a sonic echo ranging receiver, a multielement transducer, a scanning commutator connected to said multielement transducer, a receiving amplifier connected to said scanning commutator, means connected to said amplifier to produce a first pulse contemporaneous with a received echo and a second pulse delayed with respect to said received echo by a time interval substantially equal to the time required to scan one element of said transducer, combining means connected to said first mentioned means to produce an output pulse having an amplitude proportional to the difference between the respective amplitudes of said first and second pulses, and means connected to said combining means for differentiating said output pulses and applying said differentiated output pulses to the luminescence controlling element of a cathode ray tube.

4. In a device for enhancing the sharpness of an echo indication of a sonic echo ranging receiver, a multielement transducer, a scanning commutator connected to said multielement transducer, a receiving amplifier connected to said scanning commutator, means connected to said receiving amplifier to produce from said amplifier a first pulse contemporaneous with a received echo and a second pulse delayed with respect to said received echo by a time interval substantially equal to the time required to scan one element of said transducer, individualized rectifiers of opposite polarity connected to said aforesaid means to be energized by said first and second pulses respectively, and combining means connected to said rectifiers to produce an output pulse having an amplitude proportional to the difference between the respective amplitudes of said first and second pulses, and differentiating means connected to said combining means for differentiating said output pulses and applying said differentiated output pulses to the luminescence controlling element of a cathode ray tube.

UNITED STATES PATENTS

References Cited in the file of this patent

| | | |
|---|---|---|
| 2,166,991 | Guanella | July 25, 1939 |
| 2,211,942 | White | Aug. 20, 1940 |
| 2,230,212 | Crosby | Jan. 28, 1941 |
| 2,433,332 | Benioff | Dec. 30, 1947 |
| 2,473,974 | Schuck | June 21, 1949 |

FOREIGN PATENTS

| | | |
|---|---|---|
| 567,999 | Germany | Jan. 12, 1933 |

OTHER REFERENCES

Batcher article, "Electronic Industries," August 1943, pages 67 and 72. Copy in 175/183–S, Div. 48.